(12) United States Patent
Yamaji et al.

(10) Patent No.: US 11,618,695 B2
(45) Date of Patent: Apr. 4, 2023

(54) LIQUID TREATMENT DEVICE

(71) Applicant: SHARP KABUSHIKI KAISHA, Sakai (JP)

(72) Inventors: Hiroyuki Yamaji, Sakai (JP); Shohei Komaru, Sakai (JP); Fumiaki Sugimori, Sakai (JP); Chiharu Hirayama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 374 days.

(21) Appl. No.: 16/790,617

(22) Filed: Feb. 13, 2020

(65) Prior Publication Data

US 2020/0262722 A1 Aug. 20, 2020

(30) Foreign Application Priority Data

Feb. 20, 2019 (JP) .............................. JP2019-028675

(51) Int. Cl.
*C02F 1/46* (2006.01)
*H05H 1/24* (2006.01)
*C02F 1/461* (2023.01)

(52) U.S. Cl.
CPC ........ *C02F 1/4608* (2013.01); *C02F 1/46109* (2013.01); *H05H 1/2406* (2013.01); *C02F 2201/4616* (2013.01); *C02F 2201/46135* (2013.01); *H05H 1/2418* (2021.05)

(58) Field of Classification Search
CPC ..... C02F 1/46; C02F 1/32; C02F 1/72; H05H 1/24
See application file for complete search history.

(56) References Cited

U.S. PATENT DOCUMENTS

2017/0327390 A1* 11/2017 Imada .................. C02F 1/4608
2018/0002199 A1 1/2018 Yokoyama et al.

FOREIGN PATENT DOCUMENTS

| CN | 103754994 A | | 4/2014 | |
|---|---|---|---|---|
| CN | 107466148 A | * | 12/2017 | ............... A61L 2/14 |
| CN | 110311575 A | * | 10/2019 | ............ H02M 5/458 |
| WO | WO-2014171383 A1 | * | 10/2014 | ................ C02F 1/46 |
| WO | 2016/151970 A1 | | 9/2016 | |

* cited by examiner

*Primary Examiner* — Walter D. Griffin
*Assistant Examiner* — Cameron J Allen
(74) *Attorney, Agent, or Firm* — ScienBiziP, P.C.

(57) ABSTRACT

A liquid treatment device includes an electron emitting element, a first power supply, and a second power supply. The electron emitting element including a first electrode which is disposed facing water. The first power supply discharges electrons from the first electrode by applying a drive voltage to the electron emitting element. The second power supply applies a collection voltage between the first electrode and the water. The liquid treatment device preferably controls a substance added to the water by controlling the drive voltage.

10 Claims, 7 Drawing Sheets

LIQUID TREATMENT DEVICE

BACKGROUND OF THE INVENTION

Field of the Invention

The present invention relates to a liquid treatment device.

Description of the Background Art

Conventionally, a liquid treatment device is known that treats water to generate sterilized water (for example, see International Publication No. WO2016/151970). The liquid treatment device described in International Publication No. WO2016/151970 first applies a voltage between a first electrode and a second electrode, and then generates a plasma between the first electrode and the second electrode. Then, the liquid treatment device described in International Publication No. WO2016/151970 generates sterilized water by supplying the plasma to the water.

SUMMARY OF THE INVENTION

However, when plasma is generated using an arc discharge, there is a problem of heat generation. In order to suppress overheating due to an arc discharge, a device having a cooling function must be separately provided. Therefore, the device configuration becomes complicated.

Furthermore, when an atmospheric pressure plasma is used as the plasma, it is necessary to prepare a gas other than air, such as oxygen and argon, and provide a mechanism to deliver the gas. Therefore, the device configuration becomes complicated.

The present invention has an object of providing a liquid treatment device which is capable of simplifying the device configuration.

According to a first aspect of the present invention, a liquid treatment device includes an electron emitting element, a first voltage applier, and a second voltage applier. The electron emitting element is including an electrode that is disposed facing liquid. The first voltage applier discharges electrons from the electrode by applying a drive voltage to the electron emitting element. The second voltage applier applies a collection voltage between the electrode and the liquid.

According to the present invention, the device configuration of a liquid treatment device can be simplified.

DESCRIPTION OF THE PREFERRED EMBODIMENTS

Figure 1:
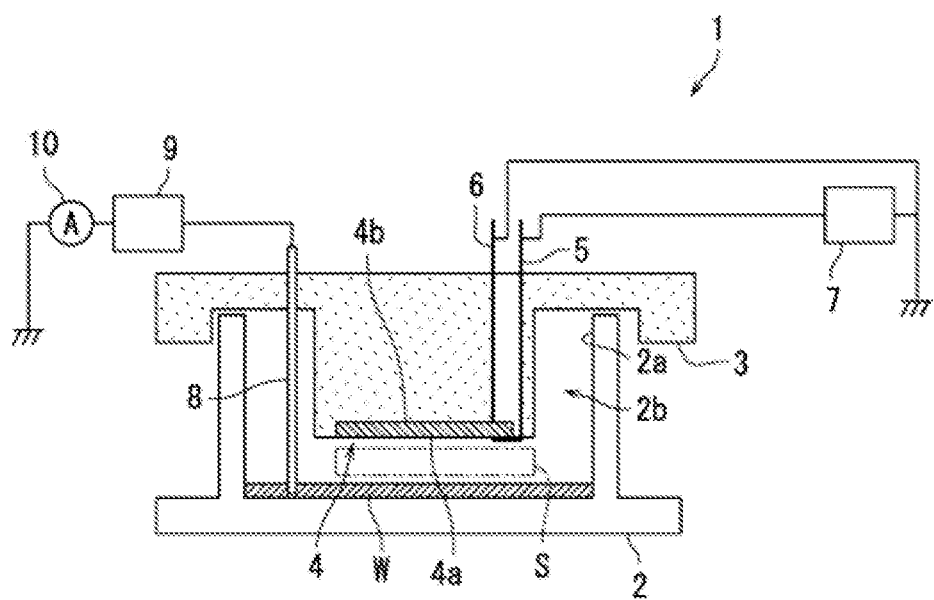
FIG. 1 is a schematic diagram showing a liquid treatment device according to an embodiment of the present invention.

The liquid treatment device 1, which is an embodiment of the present invention, will be described with reference to the drawings. In the drawings, the same or corresponding sections are denoted by the same reference numerals, and the description will not be repeated.

The liquid treatment device 1 according to an embodiment of the present invention will be described with reference to FIG. 1. FIG. 1 is a schematic diagram showing the liquid treatment device 1 according to an embodiment of the present invention.

The liquid treatment device 1 generates a treated liquid by discharging electrons into the air. The treated liquid represents a substance in which a target substance has been dissolved in a liquid. The target substance represents, for example, radicals or ions. The target substance includes, for example, at least one of nitrite ions, hydrogen peroxide, and ozone.

The target substance is an example of the substance which is added to a liquid according to the present invention.

As shown in FIG. 1, the liquid treatment device 1 includes a vessel 2, a lid 3, an electron emitting element 4, a first drive electrode 5, a second drive electrode 6, a first power supply 7, a collecting electrode 8, a second power supply 9, and an ammeter 10.

Water W is stored in the vessel 2. The water W is, for example, ion-exchanged water. The water W is an example of the liquid according, the present invention.

The liquid stored in the vessel 2 is not limited to water W. The liquid stored in the vessel 2 may be any liquid in which the target substance can be dissolved. The liquid stored in the vessel 2 may be, for example, a cell culture solution.

The vessel 2 is a hollow member having an opening 2a formed at the top. An internal space 2b is formed inside the vessel 2. The internal space 2b of the vessel 2 is communicated with the outside of the vessel 2 via the opening 2a. The water W is stored in the internal space 2b of the vessel 2.

The vessel 2 is formed of, for example, a resin, glass, or metal. The inner surface of the vessel 2 is preferably covered with a material having an insulating property. The inner surface of the vessel 2 represents the surface that forms the internal space 2b. If the liquid stored in the vessel 2 generates heat, a heat-discharging member such as a heat sink or a cooling mechanism having a Peltier element may be provided to a lower portion of the vessel 2.

The lid 3 is attached to the opening 2a of the vessel 2. The lid 3 is disposed on an upper portion of the internal space 2b. The lid 3 closes the internal space 2b. The electron emitting element 4 is attached to the lid 3.

The surface of the lid 3 that makes contact with the electron emitting element 4 is preferably formed of a material having an insulating property. Consequently, the leakage of current from the electron emitting element 4 can be suppressed.

When power is supplied to the electron emitting element 4, the electron emitting element 4 may sometimes generate heat. Therefore, the lid 3 is preferably formed of a material having a heat-resistant property.

The lid 3 may be formed of an insulating resin having a heat-resistant property and an insulating property. In this case, the lid 3 may be formed of, for example, a thermosetting resin such as a phenol resin or an epoxy resin, polyether ether ketone (PEEK), polyphenylene sulfide (PPS), polyimide (PI), or polytetrafluoroethylene (PTFE).

The lid 3 may be constituted by a member formed of metal having good thermal conductivity, whose surface has been subjected to insulation treatment. An example of a metal having good thermal conductivity is aluminum. An example of an insulation treatment is an alumite treatment. The lid 3 may be constituted by a ceramic having a good thermal conductivity such as alumina nitride.

The electron emitting element 4 discharges electrons. The electron emitting element 4 includes a first electrode 4a and a second electrode 4b.

The first electrode 4a is an example of an electrode according to the present invention.

The first electrode 4a has a conductive property. The first electrode 4a is disposed facing the water W. The first electrode 4a is positioned in a location which is separated from the water W, and is disposed above the water W.

The second electrode 4b has a conductive property. The second electrode 4b is positioned in a location which is separated from the water W. The second electrode 4b is disposed facing the first electrode 4a, and is disposed above the first electrode 4a.

The first drive electrode 5 is provided to secure a contact with the first electrode 4a. The first drive electrode 5 has a conductive property. The first drive electrode 5 is positioned in a location which is separated from the water W. The first drive electrode 5 is connected to the first electrode 4a. Being connected indicates that energization is possible.

The first drive electrode 5 is preferably formed using a predetermined group of metals. The predetermined group of metals represents gold, platinum, silver, copper, and tungsten. In this case, the first drive electrode 5 may be formed of one kind of metal from the predetermined group of metals. Furthermore, the first drive electrode 5 may be formed of an alloy of two or more types of metals from the predetermined group of metals. Moreover, the first drive electrode 5 may be a member whose surface has been plated using one or more types of metals from the predetermined group of metals. As a result, the first drive electrode 5 can more reliably secure the contact with the first electrode 4a, even under a high humidity environment.

The second drive electrode 6 is provided to secure a contact with the second electrode 4b. The second drive electrode 6 has a conductive property. The second drive electrode 6 is positioned in a location which is separated from the water W. The second drive electrode 6 is connected to the second electrode 4b. The second drive electrode 6 is connected to a ground point (reference potential point). The second drive electrode 6 is preferably formed using the predetermined group of metals in the same manner as the first drive electrode 5.

The first power supply 7 is connected to the first drive electrode 5. The first power supply 7 is connected to a ground point. The first power supply 7 applies a drive voltage to the electron emitting element 4. The application of a drive voltage to the electron emitting element 4 indicates application of a voltage between the first electrode 4a and the second electrode 4b.

The drive voltage is an AC voltage. The frequency of the AC voltage is, for example, 10 Hz or more and 10,000 Hz or less. The maximum value of the AC voltage is for example, 5 volts or more and 50 volts or less. The waveform of the AC voltage is a rectangular wave. Therefore, when the drive voltage is applied to the electron emitting element 4, a potential difference is intermittently formed between the first electrode 4a and the second electrode 4b.

The duty ratio of the drive voltage applied to the electron emitting element 4 by the first power supply 7 can be changed.

The first power supply 7 is an example of a first voltage applier according to the present invention.

The first power supply 7 applies the drive voltage to the electron emitting element 4 so that the potential of the first electrode 4a becomes higher than the potential of the second electrode 4b. When the drive voltage is applied to the electron emitting element 4 by the first power supply 7, electrons are discharged from the first electrode 4a into a discharge space S.

The discharge space S is a space located between the first electrode 4a and the water W. Air is present in the discharge space S. The discharge space S is formed in the internal space 2b of the vessel 2.

The amount of electrons discharged from the first electrode 4a changes according to the value of the drive voltage applied to the electron emitting element 4 by the first power supply 7. The value of the drive voltage specifically represents a maximum value of the drive voltage, which is an AC voltage. When the duty ratio of the drive voltage is held constant, the amount of electrons discharged from the first electrode 4a increases as the value of the drive voltage increases. The amount of electrons specifically indicates the amount of electrons per unit time.

The kinetic energy of the electrons discharged from the first electrode 4a changes according to the magnitude of the drive voltage applied to the electron emitting element 4 by the first power supply 7. The kinetic energy of the electrons discharged from the first electrode 4a increases as the drive voltage applied to the electron emitting element 4 increases.

The collecting electrode 8 has a conductive property. The shape of the collecting electrode 8 is not particularly limited. The collecting electrode 8 makes contact with the water W. The potential of the collecting electrode 8 is the same as the potential of the water W.

The second power supply 9 is connected to the collecting electrode 8. The second power supply 9 is connected to a ground point via the ammeter 10.

The second power supply 9 applies a collection voltage between the first electrode 4a and the water W. The collection voltage represents a potential difference generated between the first electrode 4a and the water W as a result of the second power supply 9 applying a voltage between the collecting electrode 8 and the ground point.

The collection voltage is a DC voltage. The collection voltage is, for example, a DC voltage of 50 volts or more and 2,000 volts or less. The collection voltage may also be an AC voltage.

The second power supply 9 is an example of a second voltage applies according to the present invention.

The second power supply 9 applies the collection voltage such that the potential of the water W becomes higher than the potential of the first electrode 4a. Consequently, when electrons are discharged from the first electrode 4a to the discharge space S, the electrons move toward the water W due to the potential difference between the water W and the first electrode 4a.

The ammeter 10 measures the current that flows through the water W. The current that flows through the water W represents, in other words, the current that flows through the collecting electrode 8. This is because the electrons discharged from the first electrode 4a reach the water W and then flow to collecting electrode 8 via the water W. Therefore, the current flowing through the water W can be regarded as the current flowing through the collecting electrode 8.

The ammeter 10 is an example of a current measure according to the present invention.

Figure 2:
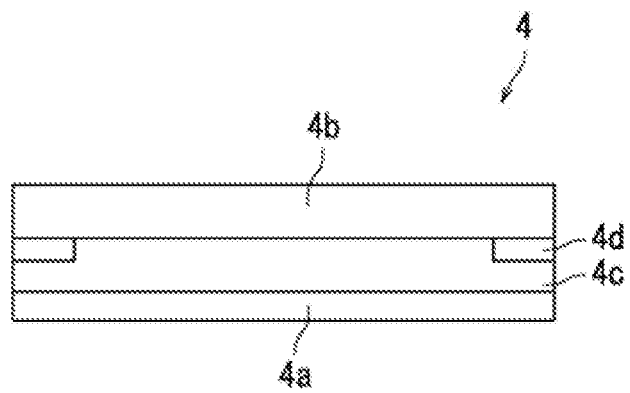
FIG. 2 is a schematic diagram showing an electron emitting element.

The electron emitting element 4 will be described with reference to FIG. 1 and FIG. 2. FIG. 2 is a schematic diagram showing the electron emitting element 4.

As shown in FIG. 2, the electron emitting element 4 further includes an intermediate layer 4c and an insulating layer 4d.

The intermediate layer 4c is disposed between the first electrode 4a and the second electrode 4b. The intermediate layer 4c has a predetermined volume resistivity such that the intermediate layer 4c has a high resistance. The predetermined volume resistivity is, for example, $1 \times 10^5$ Ω·m or more, and $1 \times 10^9$ Ω·m or less.

The insulating layer 4d is provided on the second electrode 4b. The insulating layer 44 is formed of a material having an insulating property. The insulating layer 4d blocks the current that flows from the second electrode 4b to the first electrode 4a.

The electron emitting element 4 is produced for example, using the following procedure. The insulating layer 4d is firstly formed on the second electrode 4b. Then, the intermediate layer 4c is formed on the second electrode 4b. The intermediate layer 4c is formed by applying a silicone resin containing dispersed silver nanoparticles to the second electrode 4b by spraying. Then, the first electrode 4a is formed on the surface of the intermediate layer 4c using, for example, a sputtering device. The electron emitting element 4 is produced as a result of the above.

The second electrode 4b is formed of, for example, aluminum having a thickness of about 1 mm. For example, an alumite treatment is performed on the insulating layer 4d. The thickness of the intermediate layer 4c applied to the second electrode 4b is, for example, 1 μm or more and 2 μm or less. The first electrode 4a is formed of, for example, gold or platinum having a thickness of 10 nm or more and 50 nm or less.

As shown in FIG. 1 and FIG. 2, when the first power supply 7 applies a drive voltage to the electron emitting element 4 so that the potential of the first electrode 4a becomes higher than the potential of the second electrode 4b, an electric field is generated in the intermediate layer 4c. As a result, electrons are generated in the intermediate layer 4c, and the electrons are discharged via the first electrode 4a.

Figure 3:
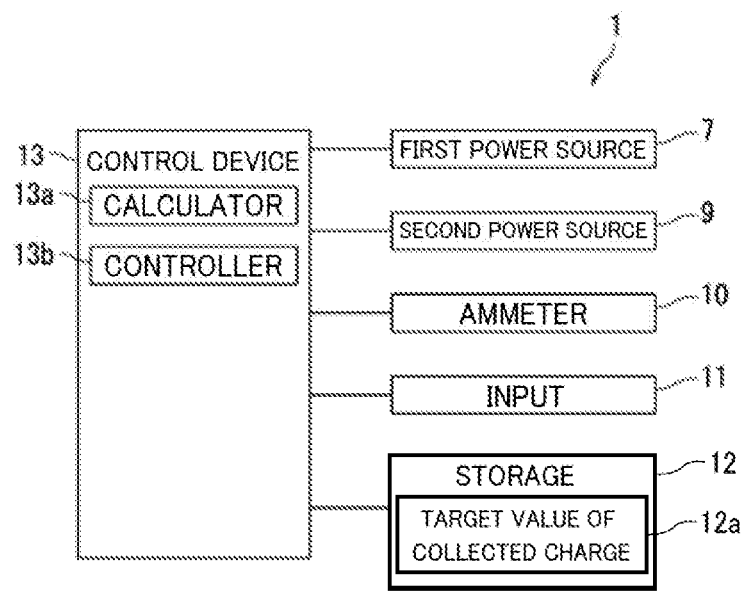
FIG. 3 is a block diagram showing a configuration of the liquid treatment device.

Next, the liquid treatment device 1 is further described with reference to FIG. 3. FIG. 3 is a block diagram showing a configuration of the liquid treatment device 1.

As shown in FIG. 3, the liquid treatment device 1 further includes an input 11, a storage 12, and a control device 13.

The input 11 accepts an instruction made with respect to the liquid treatment device 1. The instruction which is accepted by the input 11 is transmitted to the control device 13. As a result, the control device 13 operates according to the instruction accepted by the input 11.

The storage 12 includes a primary storage device (such as a semiconductor memory), such as a read only memory (ROM) and a random access memory (RAM), and may further include an auxiliary storage device (such as a hard disk drive). The primary storage device and/or the secondary storage device store various computer programs executed by the control device 13.

The storage 12 stores information 12a which represents a target value of an amount of collected charge. The target value of the amount of collected charge is stored in the storage 12 in advance.

The amount of collected charge represents the amount of charge that flows through the water W. The amount of charge that flows through the water W represents, in other words, the amount of charge that flows through the collecting electrode 8.

The control device 13 includes a processor such as a central processing unit (CPU) or a micro processing unit (MPU). The control device 13 controls the components of the liquid treatment device 1. Specifically, the processor of the control device 13 controls the first power supply 7, the second power supply 9, the ammeter 10, the input 11, and the storage 12 by executing a computer program stored in the storage 12.

The control device 13 includes a calculator 13a and a controller 13b. Specifically, the processor of the control device 13 functions as the calculator 13a and the controller 13b by executing a computer program stored in the storage 12.

The calculator 13a calculates the amount of collected charge. The calculator 13a calculates the amount of collected charge based on a measurement result from the ammeter 10. The calculator 13a calculates the amount of collected charge, for example, by integrating the measurement value of the ammeter 10 over the duration in which the current was measured by the ammeter 10.

The controller 13b controls (adjusts) the drive voltage applied to the electron emitting element 4 (see FIG. 1) by controlling the first power supply 7. The controller 13b controls the duty ratio of the drive voltage applied by the first power supply 7 by controlling the first power supply 7. The controller 13b controls the collection voltage by controlling the second power supply 9.

Next, the principle by which a treated liquid Y is generated will be described with reference to FIG. 1, and FIG. 4A to FIG. 4C.

Figure 4A:
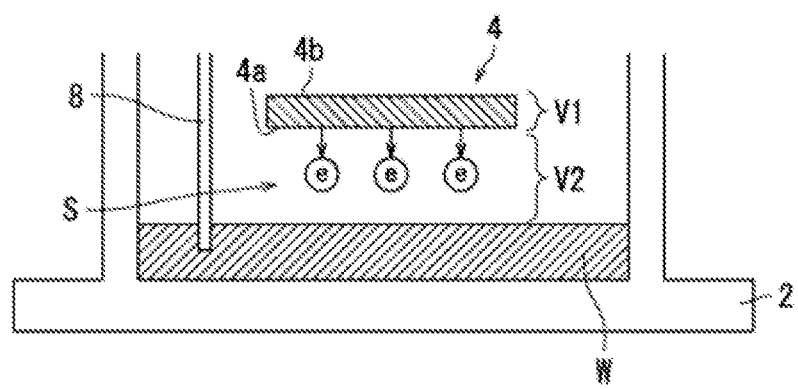
FIG. 4A is a diagram showing a state where electrons are being discharged from a first electrode of the electron emitting element.

FIG. 4A is a diagram showing a state where electrons are being discharged from the first electrode 4a of the electron emitting element 4. As shown in FIG. 1 and FIG. 4A, electrons are discharged from the first electrode 4a into the discharge space S as a result of a drive voltage V1 being applied to the electron emitting element 4 by the first power supply 7. The electrons discharged into the discharge space S collide with the substances that constitute air, such as oxygen and nitrogen. Then, the bonds of the molecules of the substances constituting the air are broken by the kinetic energy of the electrons. As a result, an ionic substance G and various radicals are generated.

Figure 4B:
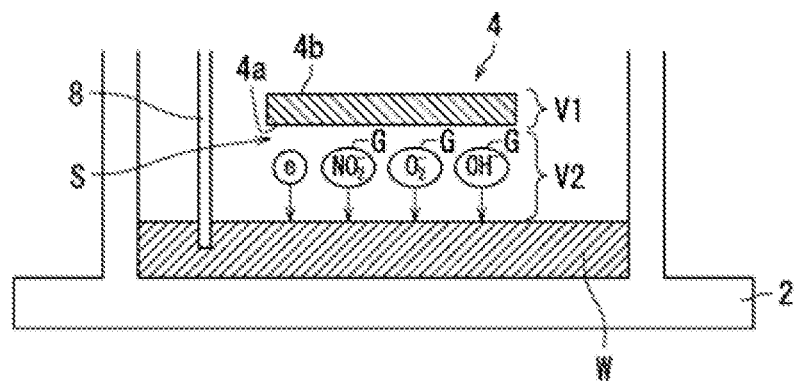
FIG. 4B is a diagram showing a state where an ionic substance has been generated inside a discharge space.

FIG. 4B is a diagram showing a state where an ionic substance G have been generated inside the discharge space S. The ionic substance G represents the substances which are generated as a result of electrons being discharged into the air, which then become drawn into the water W by the collection voltage. The ionic substance G is, for example, anions such as nitrite ions ($NO^{2-}$) or oxide ions ($O^{2-}$), hydroxyl radicals, or the like.

As shown in FIG. 1 and FIG. 4B, a collection voltage V2 is applied between the first electrode 4a and the water W by the second power supply 9. As a result, a potential difference occurs between the first electrode 4a and the water W.

The potential of the water W is higher than the potential of the first electrode 4a. Therefore, the ionic substance G generated inside the discharge space S are drawn into the water W due to the potential difference between the water W and the first electrode 4a.

Figure 4C:
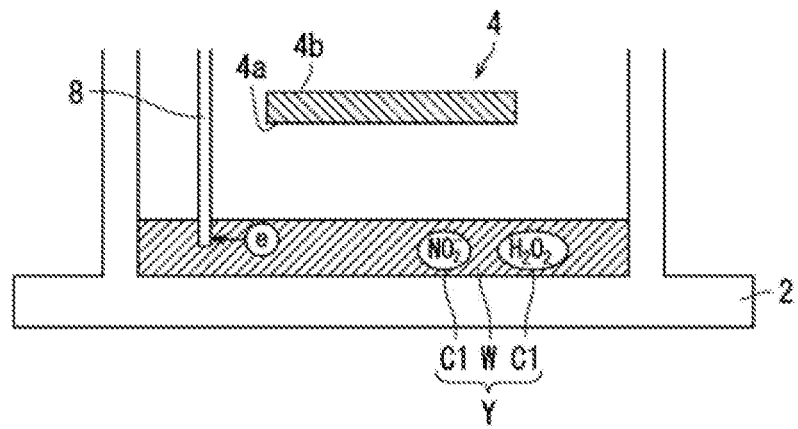
FIG. 4C is a diagram showing a state where a treated liquid has been generated.

FIG. 4C is a diagram showing a state where a treated liquid Y has been generated. As shown in FIG. 4C, a target substance C1 is generated in the water W by drawing the ionic substance G into the water W. Then, the treated liquid Y is generated as a result of the target substance C1 becoming dissolved in the water W. The treated liquid Y includes the water W and the target substance C1. The target substance C1 is composed of, for example, nitrite ions and hydrogen peroxide ($H_2O_2$).

As shown in FIG. 1 and FIG. 4C, of the electrons discharged from the first electrode 4a, those that reach the water W flow to the ground point through the collecting electrode 8, the second power supply 9, and the ammeter 10.

Figure 5:
FIG. 5 is a table showing results of a first experiment.

Hereinafter, a first experiment carried out by the inventor of the present application will be described with reference to FIG. 1 and FIG. 5. FIG. 5 is a table C showing the results of the first experiment carried out by the inventor of the present application.

In Table C, the concentration C3 of the target substance C1 represents the proportion of the target substance C1 in the treated liquid Y.

As shown in FIG. 1 and FIG. 5, in the first experiment, the type of generated target substance C1, the concentration C3 of the target substance C1, and the amount of collected charge C2 were measured each time the drive voltage V1 applied to the electron emitting element 4 was changed.

Hereunder, the procedure of the first experiment carried out by the inventor of the present application will be described. Firstly, the inventors of the present application installed the electron emitting element 4 on the lid 3. Then, the inventors of the present application set the value of the drive voltage V1 applied to the electron emitting element 4 to 15 V. Further, the inventors of the present application maintained for 20 minutes a state in which the drive voltage V1 of 15 volts was applied. Then, after 20 minutes elapsed, the inventors of the present application measured the type of target substance C1 which was dissolved in the water W, and the concentration C3 of the target substance C1. Further, the inventors of the present application measured the amount of collected charge C2 after applying the drive voltage V1 of 15 volts to the electron emitting element 4 for 20 minutes.

In addition, the inventors of the present application measured the type of target substance C1, the concentration C3 of the target substance C1, and the amount of collected charge C2 when the value of the drive voltage V1 was 20 volts, when the value of the drive voltage V1 was 22 volts, and when the value of the drive voltage V1 was 25 volts by performing experiments using the same procedure as when the value of the drive voltage V1 was 15 volts.

The inventors of the present application used 18 mL of water W carrying out the first experiment. Furthermore, the inventors of the present application set the collection voltage to 600 volts when carrying out the first experiment.

Hereinafter, the results of the first experiment carried out by the inventors of the present application will be described with reference to FIG. 5.

As shown in FIG. 5, in Table C, the target substance C1, the drive voltage V1, the amount of collected charge, and the concentration C3 are associated.

As shown in Table C, when the value of the drive voltage V1 was 20 volts, no nitrite ions were generated as the target substance C1. When the value of the drive voltage V1 was 22 volts and 25 volts, nitrite ions were generated as the target substance C1. When the value of the drive voltage V1 was 15 volts, 20 volts, and 25 volts, hydrogen peroxide was generated as the target substance C1.

Therefore, by setting the value of the drive voltage V1 to 20 volts or less, it is possible to add hydrogen peroxide to the water W but substantially not add nitrite ions. Furthermore, by setting the value of the drive voltage V1 to 22 volts or more, it is possible to add both nitrite ions and hydrogen peroxide to the water W. As a result, the type of target substance C1 can be controlled by controlling the value of the drive voltage V1 via the control device 13 (see FIG. 3). Specifically, controlling the value of the drive voltage V1 represents adjusting the value of the drive voltage V1.

Moreover, the concentration C3 increases as the value of the drive voltage V1 increases. Therefore, the concentration C3 of the target substance C1 can be controlled by controlling the value of the drive voltage V1 via the control device 13.

The concentration C3 of nitrite ions is measured using, for example, ion chromatography. The concentration C3 of the hydrogen peroxide solution is measured using, for example, a pack test.

When the treated liquid Y contains nitrite ions, the treated liquid Y can be used, for example, as a fertilizer for plants.

When the treated liquid Y contains hydrogen peroxide, the treated liquid Y can be used, for example, as a fungicide. In addition, when a treated liquid Y containing hydrogen peroxide but substantially containing no nitrite ions is generated by setting the value of the drive voltage V1 to 20 volts or less, a clean fungicide substantially free of residual nitrogen-based substances can be generated.

Therefore, by applying the drive voltage V1 to the electron emitting element 4 and applying the collection voltage between the first electrode 4a and the water W, the treated liquid Y can be provided with a desired function.

As described above with reference to FIG. 5, the water W can be treated by applying the drive voltage V1 to the electron emitting element 4 and applying the collection voltage between the first electrode 4a and the water W. Treatment of the water W indicates generating a treated liquid Y having a specific function from the water W. The specific function indicates a function added to the water W, such as a plant fertilizer function or a fungicide function.

In addition, the liquid treatment device 1 treats the water W using the electron emitting element 4 and without using a plasma. Therefor it is possible to suppress the problem of heat generation and the problem of having to prepare a gas other than air. As a result, the device configuration of the liquid treatment device 1 can be simplified. Furthermore, because the water W can be treated without preparing a gas other than air, the running cost of the liquid treatment device 1 can be reduced.

Moreover, the controller 13b controls the target substance C1 added to the water W by controlling the drive voltage V1 applied to the electron emitting element 4 by the first power supply 7. In the present embodiment, because the drive voltage V1 is an AC voltage, the maximum value of the drive voltage V1 is controlled. As a result, by adjusting the drive voltage V1, the treated liquid Y can be provided with a desired function. Controlling the target substance C1 indicates controlling the type of the target substance C1 and/or the concentration C3.

Furthermore, because the liquid treatment device 1 treats the water W using the electron emitting element 4, the treatment of the water W can be performed more mildly than in a case where the water W is treated using a plasma. As a result, the type of target substance C1 and the concentration C3 can be easily controlled compared with a case where the water W is treated using a plasma.

Figure 6:
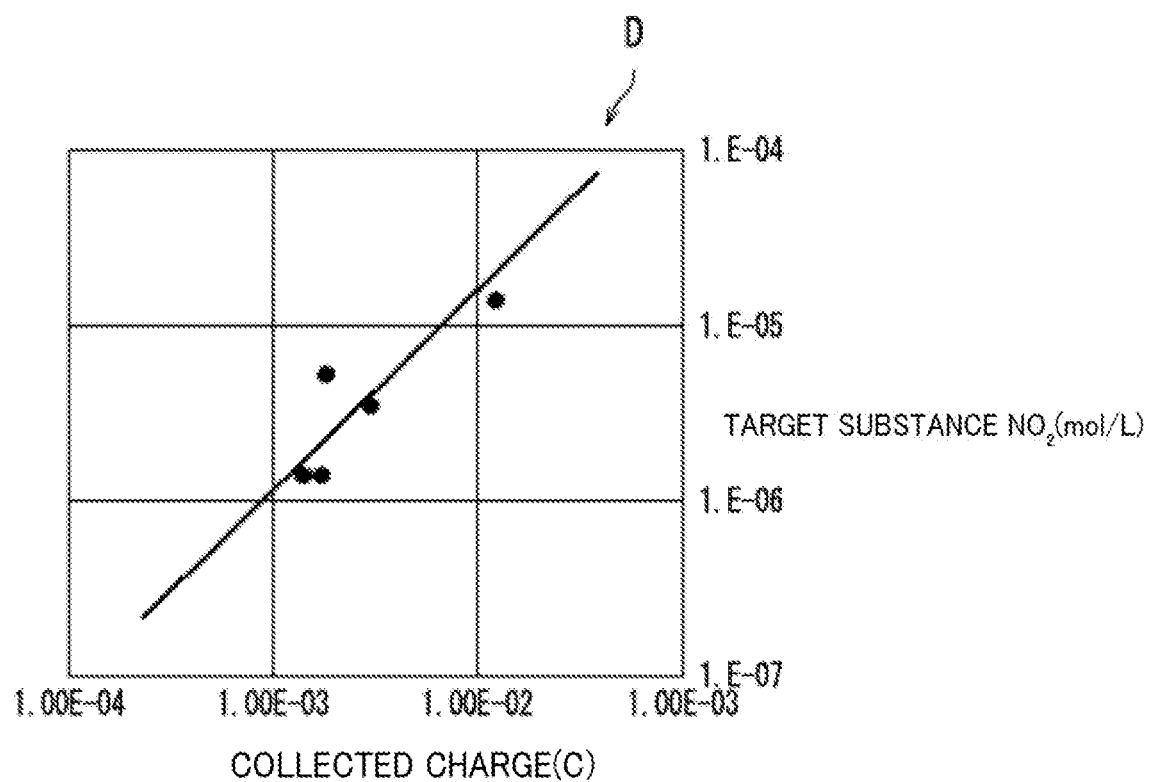
FIG. 6 is a graph showing results of a second experiment.

Hereinafter, a second experiment carried out by the inventors of the present application will be described with reference to FIG. 1, FIG. 6, and FIG. 7. FIG. 6 is a graph D showing the results of the second experiment carried out by the inventors of the present application.

As shown in FIGS. 1 and 6, in the second experiment, the voltage application time and the potential difference between the first electrode 4a and the collecting electrode 8 were each appropriately changed. The amount of collected charge and the concentration of the target substance (nitrite ions) in the treated liquid were measured each time the voltage application time and the potential difference were changed. Then, the graph D, which shows the relationship between the amount of collected charge and the concentration of the target substance in the treated liquid, was created based on the measurement results.

The voltage application time represents the duration in which the drive voltage is applied to the electron emitting element 4 by the first power supply 7. The voltage application time represents, in other words, the duration in which the electron emitting element 4 is driven. In the second experiment, the voltage application time was varied between 10 minutes and 60 minutes. Furthermore, the potential difference between the first electrode 4a and the collecting electrode 8 was varied between 600 volts and 1000 volts.

As shown in the graph D, the concentration of the target substance in the treated liquid increases as the amount of collected charge increases. Therefore, there is a correlation between the amount of collected charge and the concentration of the target substance. As a result, the concentration of the target substance can be controlled by controlling the amount of collected charge using the controller 13b.

Hereinafter, a first example of a configuration in which the controller 13b controls the amount of collected charge will be described.

In the first example, the controller 13b controls the amount of collected charge by controlling the voltage application time by the first power supply 7.

The principle behind the first example will be described. The total amount of electrons discharged from the electron emitting element 4 increases as the voltage application time becomes longer. Therefore, the amount of collected charge increases. Therefore, there is a correlation between the voltage application time and the amount of collected charge. As a result, it is possible to control the amount of collected charge by controlling the voltage application time.

As described above, the controller 13b controls the amount of collected charge by controlling the voltage application time by the first power supply 7. Specifically, the controller 13b increases the amount of collected charge by increasing the voltage application time by the first power supply 7, and decreases the amount of collected charge by decreasing the voltage application time by the first power supply 7. Furthermore, there is a correlation between the amount of collected charge and the concentration of the target substance. Therefore, the concentration of the target substance can be made a desired concentration by controlling the voltage application time by the first power supply 7.

Furthermore, the concentration of the target substance is controlled by controlling the voltage application time by the first power supply 7. Therefore, it is not necessary to vary the value of the drive voltage applied to the electron emitting element 4 by the first power supply 7. If the value of the drive voltage applied to the electron emitting element 4 is not varied, the type of target substance remains unchanged. Therefore, the concentration of the target substance can be controlled without changing the type of target substance.

Next, a second example of a configuration in which the controller 13b controls the amount of collected charge will be described.

In the second example, controller 13b controls the amount of collected charge by controlling the collection voltage using the second power supply 9.

The principle behind the second example will be described. The electric field between the first electrode 4a and the water W increases as the collection voltage increases. As the electric field between the first electrode 4a and the water increases, the electrons discharged from the electron emitting element 4 can be more efficiently drawn into the water W. Therefore, the amount of collected charge increases. Therefore, there is a correlation between the collection voltage and the amount of collected charge. As a result, it is possible to control the amount of collected charge by controlling the collection voltage.

The inventors of the present application carried out a third experiment to investigate the relationship between the collection voltage and the amount of collected charge. FIG. 7 is a table E showing the results of the third experiment carried out by the inventors of the present application.

Figure 7:
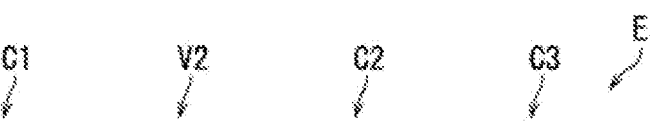
FIG. 7 is a table showing results of a third experiment.

As shown in FIG. 7, in Table E, the target substance C1, the collection voltage V2, the amount of collected charge C2, and the concentration C3 are associated. The target substance C1 is hydrogen peroxide. As shown in Table E, when the collection voltage V2 was 564 volts, the amount of collected charge C2 was 1.08E-03 coulombs. When the collection voltage V2 was 994 volts, the amount of collected charge C2 was 3.91E-03 coulombs. Therefore, the amount of collected charge C2 increased as the collection voltage V2 increased.

As described above, the controller 13b controls the amount of collected charge by controlling the collection voltage. Specifically, the controller 13b increases the amount of collected charge by increasing the collection voltage, and decreases the amount of collected charge by decreasing the collection voltage. Furthermore, there is a correlation between the collection voltage and the concentration of the target substance. Therefore, the concentration of the target substance can be made a desired concentration by controlling the collection voltage.

Furthermore, the concentration of the target substance is controlled by controlling the collection voltage applied by the second power supply 9. Therefore, it is not necessary to vary the value of the drive voltage applied to the electron emitting element 4 by the first power supply 7. Therefore, the concentration of the target substance can be controlled without changing the type of target substance.

Next, a third example of a configuration in which the controller 13b controls the amount of collected charge will be described.

In the third example, the controller 13b controls the amount of collected charge by controlling the duty ratio of the drive voltage applied to the electron emitting element 4 by the first power supply 7.

The principle behind the third example will be described. As the duty ratio increases, the voltage application time with respect to the electron emitting element 4 in a single cycle of the drive voltage (AC voltage), which is applied to the electron emitting element 4 by the first power supply 7, becomes longer. The amount of electrons discharged from the electron emitting element 4 each cycle increases as the voltage application time of a single cycle becomes longer. Therefore, the amount of collected charge increases. Therefore, there is a correlation between the duty ratio and the amount of collected charge. As a result, it is possible to control the amount of collected charge bye controlling the duty ratio.

As described above, the controller 13b controls the amount of collected charge by controlling the duty ratio. Specifically, the controller 13b increases the amount of collected charge by increasing the duty ratio, and decreases the amount of collected charge by decreasing the duty ratio. Furthermore, there is a correlation between the collection voltage and the concentration of the target substance. Therefore, the concentration of the target substance can be made a desired concentration by controlling the duty ratio.

Furthermore, the concentration of the target substance controlled by controlling the duty ratio of the drive voltage applied to the electron emitting element 4 by the first power supply 7. Therefore, it is not necessary to vary the value of the drive voltage applied to the electron emitting element 4 by the first power supply 7. Therefore, the concentration of the target substance can be controlled without changing the type of target substance.

Next, an example of a mode of controlling the concentration of the target substance using the controller 13b will be described with reference to FIG. 3.

As shown in FIG. 3, the controller 13b controls the concentration of the target substance based on a comparison result of the amount of collected charge calculated by the calculator 13a and the target value of the amount of collected charge stored in the storage 12. As a result of the controller 13b controlling the amount of collected charge such that the amount of collected charge calculated by the calculator 13a is equal to the target value of the amount of collected charge, the concentration of the target, substance can be made a desired concentration that corresponds to the target value of the amount of collected charge.

An embodiment of the present invention was described above with reference to the drawings (FIG. 1 to FIG. 7). However, the present invention is not limited to the embodiment described above, and implementation in various forms is possible within a scope not departing from the spirit thereof (such as (1)). Furthermore, various inventions can be formed by appropriately combining a plurality of the components disclosed in the above embodiment. For example, some components may be removed from among the components presented in the embodiment. In the drawings, each component is schematically shown mainly to aid in their understanding. Further, the number of each component in the drawings may be different from that in an actual device in order to simplify the drawings. Moreover, the components presented in the embodiment above are merely examples, and are not particularly limited. Various modifications can be made without substantially departing from the spirit of the present invention.

(1) In the present embodiment, the drive voltage applied to the electron emitting element 4 by the first power supply 7 is a rectangular AC voltage. However, the present invention is not limited to this. The drive voltage may be a DC voltage.

INDUSTRIAL APPLICABILITY

The present invention is applicable to the field of liquid treatment devices.

BRIEF DESCRIPTION OF THE REFERENCE SYMBOLS

1 Liquid treatment device
4 Electron emitting element
4a First electrode (electrode)
7 First power supply (first voltage applier)
9 Second power supply (second voltage applier)
10 Ammeter (current measure)
13a Calculator
13b Controller
V1 Drive voltage
V2 Collection voltage
W Water (liquid)

What is claimed is:

1. A liquid treatment device comprising:
an electron emitting element including a first electrode that is disposed facing a liquid, the first electrode being positioned in a location separated from the liquid, the first electrode being disposed above the liquid;
a first voltage applier that discharges electrons from the first electrode into a space in an air located between the first electrode and the liquid by applying a drive voltage to the electron emitting element;
a second voltage applier that moves the electrons discharged in the space in the air toward the liquid by applying a collection voltage between the first electrode and the liquid;
a current measuring device that measures a current that flows through the liquid;
a calculator that calculates an amount of collected charge based on a measurement result of the current measuring device, the amount of collected charge being an amount of charge flowing through the liquid; and
a controller that controls the amount of collected charge, wherein a value of the drive voltage is less than or equal to 20 volts.

2. The liquid treatment device according to claim 1, wherein a substance added to the liquid is controlled by controlling the drive voltage.

3. The liquid treatment device according to claim 1, wherein the controller controls a concentration of a substance added to the liquid by controlling the amount of collected charge.

4. The liquid treatment device according to claim 1, wherein the controller controls a concentration of a substance added to the liquid based on a comparison between the amount of collected charge calculated by the calculator and a target value of the amount of collected charge.

5. The liquid treatment device according to claim 1, wherein the controller controls the amount of collected charge by controlling an application time of the drive voltage to the electron emitting element.

6. The liquid treatment device according to claim 1, wherein the controller controls the amount of collected charge by controlling the collection voltage.

7. The liquid treatment device according to claim 1,
wherein the drive voltage is an AC voltage, and
wherein the controller controls the amount of collected charge by controlling a duty ratio of the drive voltage.

8. The liquid treatment device according to claim 1, wherein
the electron emitting element further includes:
a second electrode; and
an intermediate layer disposed between the first electrode and the second electrode, the intermediate layer being formed with a silicone resin containing dispersed silver nanoparticles.

9. A liquid treatment device comprising:
an electron emitting element including a first electrode that is disposed facing a liquid, the first electrode being positioned in a location separated from the liquid, the first electrode being disposed above the liquid;

a first power supply that is respectively connected to the electron emitting element and a ground point;

a second electrode that is disposed so as to make contact with the liquid; and a second power supply that is respectively connected to the second electrode and the ground point.

10. A liquid treatment device comprising:

an electron emitting element including:
- a first electrode that is disposed facing a liquid, the first electrode being positioned in a location separated from the liquid, the first electrode being disposed above the liquid;
- a second electrode;
- an intermediate layer disposed between the first electrode and the second electrode, the intermediate layer having a predetermined volume resistivity from $1\times10^5$ $\Omega\cdot$m to $1\times10^9$ $\Omega\cdot$m;

a first voltage applier that discharges electrons from the first electrode into a space in an air located between the first electrode and the liquid by applying a drive voltage to the electron emitting element; and a second voltage applier that moves the electrons discharged in the space in the air toward the liquid by applying a collection voltage between the first electrode and the liquid a current measuring device that measures a current that flows through the liquid, wherein a value of the drive voltage is less than or equal to 20 volts.

* * * * *